(12) United States Patent
Kussmaul

(10) Patent No.: US 10,970,358 B2
(45) Date of Patent: Apr. 6, 2021

(54) CONTENT GENERATION

(71) Applicant: International Business Machines Corporation, Armonk, NY (US)

(72) Inventor: Timo Kussmaul, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1859 days.

(21) Appl. No.: 14/090,411

(22) Filed: Nov. 26, 2013

(65) Prior Publication Data

US 2014/0164343 A1    Jun. 12, 2014

(30) Foreign Application Priority Data

Dec. 4, 2012  (GB) ...................... 1221782

(51) Int. Cl.
*G06F 16/958* (2019.01)
(52) U.S. Cl.
CPC .................. *G06F 16/958* (2019.01)
(58) Field of Classification Search
CPC ........... G06F 17/3053; G06F 17/30879; G06F 16/958; H04L 67/306; G06Q 30/0271; G06Q 30/0254
USPC ....................................................... 707/706
See application file for complete search history.

(56) References Cited

U.S. PATENT DOCUMENTS

| | | | | |
|---|---|---|---|---|
| 7,076,463 B1 * | 7/2006 | Boies | ..................... | G06Q 20/10 705/39 |
| 7,725,435 B1 * | 5/2010 | Li | ..................... | G06F 16/972 707/626 |
| 7,770,185 B2 * | 8/2010 | Naidu | ..................... | G06F 9/54 712/29 |
| 7,809,837 B2 * | 10/2010 | Allamaraju | ..................... | G06F 17/3089 709/218 |
| 7,849,157 B2 | 12/2010 | Allamaraju et al. | | |
| 7,890,601 B2 | 2/2011 | Schaeck | | |
| 8,001,216 B2 | 8/2011 | Allamaraju | | |

(Continued)

OTHER PUBLICATIONS

Connolly et al., "HTML 2.0 Materials"(https://web.archive.org/web/19970605012238/http://www.w3.org/MarkUp/html-spec/)), Nov. 1995, W3C, pp. 1 (Year: 1995).*

(Continued)

*Primary Examiner* — Jorge A Casanova
(74) *Attorney, Agent, or Firm* — Cuenot, Forsythe & Kim, LLC

(57) ABSTRACT

Generating content includes communicating first content to a consumer, wherein the first content includes at least one identifier, determining a location of the communicated first content in a network, retrieving second content from the location, and establishing third content using the second content using a processor. Determining the location of the communicated first content includes instructing a search engine to perform a search in a network for the at least one identifier and receiving, from the search engine, a search result indicative of a location of the communicated first content in the network. Establishing third content includes performing an analysis of the second content, wherein the analysis includes at least one of a semantic analysis, a syntax analysis, a keyword analysis, a markup analysis, or a link analysis.

20 Claims, 4 Drawing Sheets

(56) References Cited

U.S. PATENT DOCUMENTS

| | | | |
|---|---|---|---|
| 8,370,874 B1* | 2/2013 | Chang | H04N 21/4532 725/44 |
| 8,386,509 B1* | 2/2013 | Scofield | G06F 17/30699 707/706 |
| 2002/0070963 A1* | 6/2002 | Odero | H04L 41/22 715/739 |
| 2002/0103809 A1* | 8/2002 | Starzl | G06F 17/30864 |
| 2002/0116511 A1* | 8/2002 | Boehme | G06F 16/954 709/230 |
| 2004/0117197 A1* | 6/2004 | Dutta | G06F 21/10 705/52 |
| 2005/0097190 A1* | 5/2005 | Abdelhak | G06F 16/954 709/217 |
| 2005/0131778 A1* | 6/2005 | Bennett | G06Q 10/0875 705/29 |
| 2005/0262428 A1* | 11/2005 | Little | G06F 17/30893 715/201 |
| 2006/0085520 A1* | 4/2006 | Allamaraju | G06F 17/3089 709/218 |
| 2006/0277199 A1* | 12/2006 | Joret | G06F 16/958 |
| 2007/0005733 A1* | 1/2007 | Allamaraju | H04L 67/303 709/219 |
| 2007/0006016 A1* | 1/2007 | Allamaraju | G06F 9/4488 714/4.1 |
| 2007/0006083 A1* | 1/2007 | Daniels | G06F 16/9577 715/742 |
| 2007/0074227 A1* | 3/2007 | Naidu | G06F 9/54 719/330 |
| 2007/0124506 A1* | 5/2007 | Brown | G06F 16/954 709/252 |
| 2007/0162400 A1* | 7/2007 | Brew | G06F 21/10 705/59 |
| 2007/0186100 A1* | 8/2007 | Wakameda | H04L 63/0272 713/160 |
| 2007/0226207 A1* | 9/2007 | Tawde | G06F 16/355 |
| 2008/0033956 A1* | 2/2008 | Saha | G06F 17/30867 |
| 2008/0065604 A1* | 3/2008 | Tiu | G06F 17/30569 |
| 2008/0082941 A1* | 4/2008 | Goldberg | G06F 3/0482 715/810 |
| 2008/0163073 A1* | 7/2008 | Becker | G06Q 30/00 715/753 |
| 2008/0168135 A1* | 7/2008 | Redlich | G06Q 10/10 709/204 |
| 2008/0256443 A1* | 10/2008 | Li | G06F 16/9535 715/700 |
| 2009/0150808 A1* | 6/2009 | Aldrey | H04N 5/44543 715/764 |
| 2009/0164447 A1* | 6/2009 | Daya | G06F 16/9535 |
| 2009/0254572 A1* | 10/2009 | Redlich | G06Q 10/06 |
| 2010/0185952 A1 | 7/2010 | Blum et al. | |
| 2010/0268700 A1* | 10/2010 | Wissner | G06F 17/30864 707/706 |
| 2011/0078577 A1 | 3/2011 | Allamaraju et al. | |
| 2011/0078708 A1* | 3/2011 | Dokovski | G06F 9/545 719/329 |
| 2011/0138288 A1 | 6/2011 | Blum et al. | |
| 2011/0202848 A1* | 8/2011 | Ismalon | G06F 17/2247 715/738 |
| 2011/0208722 A1* | 8/2011 | Hannuksela | G06F 17/3002 707/723 |
| 2012/0036213 A1* | 2/2012 | Tiu, Jr. | G06F 17/30569 709/206 |
| 2013/0024440 A1* | 1/2013 | Dimassimo | G06F 17/30864 707/709 |

OTHER PUBLICATIONS

Bellas, F. et al., "An Automatic Approach to Displaying Web Applications as Portlets," [online] In Distributed Computing and Internet Technology, vol. 4317, pp. 264-277, Ed. Springer Berlin Heidelberg, 2006, retrieved from the Internet: <http://citeseerx.ist.psu.edu/viewdoc/download?doi=10.1.1.105.5684&rep=rep1&type=pdf>, 14 pg.

Weinreich, R. et al., "A Component Model for Integrating Remote Applications and Services Via Web Portals," [online] Journal of Object Technology, vol. 6, No. 8, pp. 67-94, 2007, retrieved from the Internet: <http://www.jot.fm/issues/issue_2007_09/article1.pdf?q=integrating-enterprise-applications>, 28 pg.

Weinreich, R. et al., "Enhancing presentation level integration of remote applications and services in Web portals," In IEEE Int'l. Conf. on Services Computing, vol. 2., pp. 224-231, 2005 [abstract only].

* cited by examiner

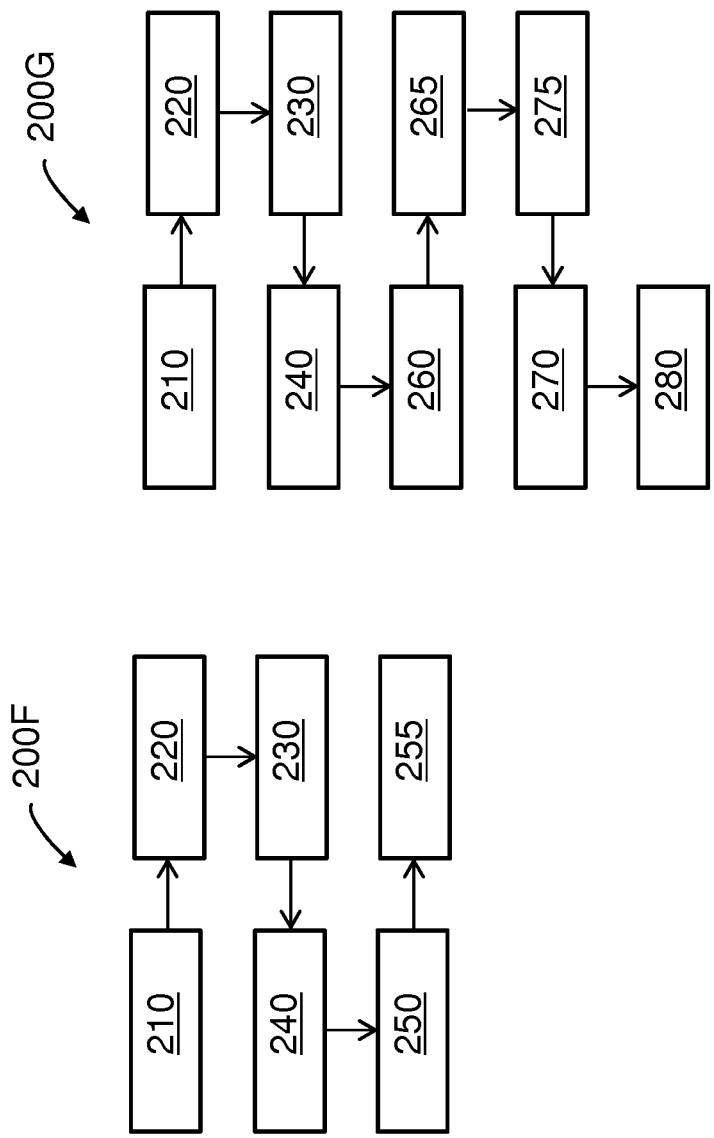

CONTENT GENERATION

CROSS-REFERENCE TO RELATED APPLICATIONS

This application claims the benefit of German Application Number 1221782.4 filed on Dec. 4, 2012, which is fully incorporated herein by reference.

BACKGROUND

It is known for a content producer to produce content that is provided to a commercial consumer to be provided by the commercial consumer to an end-user. For example, a plurality of content producers may provide content in the form of portlets to a commercial consumer, who aggregates content of their own with the portlets into a portal (e.g., a website) that can be accessed by an end-user.

SUMMARY

A method of generating content includes communicating first content to a consumer, wherein the first content includes at least one identifier, determining a location of the communicated first content in a network, retrieving second content from the location, and establishing third content using the second content using a processor. Determining the location of the communicated first content includes instructing a search engine to perform a search in a network for the at least one identifier and receiving, from the search engine, a search result indicative of a location of the communicated first content in the network. Establishing third content includes performing an analysis of the second content, wherein the analysis includes at least one of a semantic analysis, a syntax analysis, a keyword analysis, a markup analysis, or a link analysis.

A content generating system includes a processor programmed to initiate executable operations. The executable operations include communicating first content to a consumer, wherein the first content includes at least one identifier, determining a location of the communicated first content in a network, retrieving second content from the location, and establishing third content using the second content. Determining the location of the communicated first content includes instructing a search engine to perform a search in a network for the at least one identifier and receiving, from the search engine, a search result indicative of a location of the communicated first content in the network. Establishing third content includes performing an analysis of the second content, wherein the analysis includes at least one of a semantic analysis, a syntax analysis, a keyword analysis, a markup analysis, or a link analysis.

A computer program product includes a computer readable storage medium having program code stored thereon. The program code is executable by a processor to perform a method. The method includes communicating first content to a consumer using the processor, wherein the first content includes at least one identifier, determining a location of the communicated first content in a network using the processor, retrieving second content from the location using the processor, and establishing third content using the second content using the processor. Determining the location of the communicated first content includes instructing a search engine to perform a search in a network for the at least one identifier and receiving, from the search engine, a search result indicative of a location of the communicated first content in the network. Establishing third content includes performing an analysis of the second content, wherein the analysis includes at least one of a semantic analysis, a syntax analysis, a keyword analysis, a markup analysis, or a link analysis.

BRIEF DESCRIPTION OF THE SEVERAL VIEWS OF THE DRAWINGS

FIG. 2F schematically shows a flow diagram of another modified embodiment of the method of generating content shown in FIG. 2A;

FIG. 2G schematically shows a flow diagram of another modified embodiment of the method of generating content shown in FIG. 2A.

DETAILED DESCRIPTION

Figure 2A:
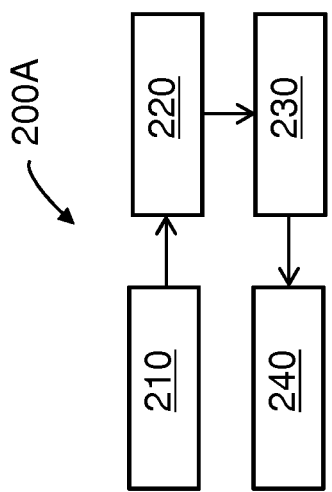
FIG. 2A schematically shows a flow diagram of an embodiment of a method of generating content in accordance with the present disclosure.

The present disclosure relates to a method of generating content, a content generating system, as well as a corresponding computer program product.

Loosely speaking, the present disclosure teaches a method of generating content in which a content producer performs a search for their own content on a network (e.g., by searching for distinctive elements of that content on the World Wide Web) so as to obtain information about the context in which that content is used by a given consumer.

The content producer may then use the context information to appropriately adapt the content provided to that given consumer without burdening the consumer. For example, the content producer can adapt the provided content in a manner that allows swifter and/or more reliable execution of the provided content, e.g., by ensuring that function names and/or identifiers used by other content on the respective consumer's portal are not employed by the provided content. Similarly, the content producer may adapt the provided content to better match the expected desires of an end-user. For example, the content producer may modify advertising content within the provided content in light of the context information.

The content producer may also use the context information to provide better (e.g., faster) service to the given consumer. For example, the content producer may use the context information to predict the likelihood of certain requests to ensure that requests that occur frequently are serviced more rapidly.

The content producer may also use the context information to ensure that the consumer is fulfilling security obligations. If it is found that the consumer is not fulfilling their security obligations, the content producer may modify the provided content to ensure that sensitive content is not revealed to the general public. Similarly, in the case of a severe security problem, the content producer may refuse to send content in response to a request from the consumer and may instead simply respond with an error message.

Still loosely speaking, the content producer may establish a unique identifier to be included in content sent to the respective consumer. The unique identifier allows content communicated to the respective consumer to be more readily/certainly identified in a vast public network such as the Internet.

In one aspect, as touched upon supra, the present disclosure relates to a method of generating content, e.g., content for incorporation into a (consumer's) website, for example content to be displayed to an end-user by a browser when visiting the (consumer's) website.

The method may comprise communicating (first) content to a consumer.

In the context of the present disclosure, "content" may be or comprise data that conforms to the HTML 2.0 standard or to any other HTML standard adopted by the World Wide Web Consortium. In the context of the present disclosure, any communication of content to a consumer, e.g., from a content producer to the consumer, may be effected in response to a content request from the (respective) consumer. Such content communicated in response to a content request is commonly called dynamic content.

In the context of the present disclosure, communication of any content requests and/or content may be effected via a public network, e.g., via the Internet, and may be effected in a secure manner that ensures confidentiality of the communicated information and/or ensures the authenticity of the sender and/or recipient.

In the context of the present disclosure, the term "consumer" as well as the term "content producer" may be understood in the sense of a natural person or legal entity as well as in the sense of a device or system. Thus, while a content producer, in the sense of a natural person or legal entity, may be obligated to provide content to a consumer, likewise in the sense of a natural person or legal entity, it will be understood that the actual communication of data (e.g., content and content requests) may be carried out between devices/systems under the respective (direct or indirect) control of the content producer/consumer. As such, the term "consumer" may be understood as a device/system hosting a publicly accessible web service, in particular a web service that comprises content obtained from a third party, e.g., from a content producer.

The method may comprise determining a location of the communicated (first) content in a network. Similarly, the method may comprise determining a location of the communicated (first) content in a remote sub-network of the network.

The network may be a public network, e.g., the Internet. The remote sub-network may be owned/operated by a different entity than the entity carrying out the determining and/or than the entity that communicated the (first) content to the consumer. The remote sub-network may be remote from all premises owned/operated by the entity carrying out the determining and/or from the device/system that communicated the (first) content to the consumer.

The determined location may be specified by a domain name, an IP address and/or a URL, i.e., by data representative of a domain name, an IP address, etc.

The determining may be carried out via a network path that differs from the network path via which the content was communicated to the consumer. The determining may be carried out via a public interface to the content, e.g., via the Internet. The determining may comprise non-secure communication over the network, i.e., communication that does not ensure confidentiality of the communicated information and/or does not ensure the authenticity of the sender and/or recipient. The determining may comprise (non-secure) communication with third parties.

The method may comprise retrieving (second) content, e.g., from the (determined) location. For example, the method may comprise retrieving content, e.g., all content, publically available at the (determined) location. Similarly, the method may comprise retrieving, in part or in entirety, content (e.g., HTML code) stored at the (determined) location. The retrieved content may comprise the first content and other (second) content.

The method may comprise establishing (third) content, e.g., using the retrieved (second) content. The establishing of content may comprise generating, modifying and/or selecting content. For example, the method may comprise modifying content, e.g., the first content, to obtain other (third) content. Such modifying may be carried out using the retrieved (second) content as a parameter for the modifying and/or using information derived from the retrieved (second) content as a parameter for the modifying. Similarly, the method may comprise selecting content, e.g., from a plurality of (stored) content items. Such selecting may be carried out using the retrieved (second) content as a parameter for the selecting and/or using information derived from the retrieved (second) content as a parameter for the selecting. As such, the method may comprise deriving information from the retrieved (second) content and may comprise using the derived information to establish (third) content, e.g., by modifying and/or selecting content using the derived information as a parameter for the modifying/selecting. Such modified and/or selected content may constitute all or part of the (third) content to be established.

For example, the method may comprise storing units of content, e.g., units of XML content such as webpage templates. Any (one or more or each) of the units of content (e.g., of the webpage templates) may comprise one or more placeholders representative of locations in the respective unit of content at which a content item (e.g., HTML code that effects graphical display of business data or an advertisement) may be positioned. The method may comprise selecting, for any (one or more or each) of the placeholders, a respective content item from a plurality of (stored) content items using the retrieved (second) content and/or using information derived from the retrieved (second) content as a parameter for the selecting and substituting the respective placeholder with the respective selected content item. The resultant unit of content, i.e., unit of content containing respectively selected content items in lieu of the placeholders, may constitute all or part of the (third) content to be established.

The (first) content may comprise at least one identifier. For example, the (first) content may comprise one or more (alphanumeric) strings that (substantially) uniquely identify the (first) content. Similarly, the (first) content may comprise expressions in HTML that (substantially) uniquely identify the (first) content.

The method may comprise instructing a search engine to perform a search in a network, e.g., a search for (any part of) the (first) content and/or a search for any (one or more or each) of the at least one identifier. The search engine may be a public search engine. The search engine may be a search engine fundamentally operated by an entity distinct from the entity instructing the search engine. The network may be a public network, e.g., the Internet. The instructing may comprise communicating a (syntactically and semantically appropriately crafted) search instruction to the search engine, e.g., a search instruction that conforms to a search instruction grammar supported by the search engine. The search instruction may be communicated to the search engine via a public network, e.g., the Internet, and may be communicated in a secure or non-secure manner as described above. The instructing of a search engine to perform a search may constitute part of the aforementioned determining of a location of the communicated (first) content in a network.

The method may comprise receiving a search result, e.g., in response to an instruction to perform a search. The search result may be received from the search engine instructed to perform the search. The search result may be indicative of a location in a network, in particular of a location of (any part of) the (first) content and/or of any (one or more or each) of the at least one identifier in the (searched) network. As touched upon supra, the location may be specified by a domain name, an IP address and/or a URL, i.e., by data representative of a domain name, an IP address, etc. The receiving of a search result may constitute part of the aforementioned determining of a location of the communicated (first) content in a network.

The method may comprise performing an analysis of retrieved content, e.g., of the retrieved second content. The analysis may comprise any (one or more or each) of a semantic analysis, a syntax analysis, a keyword analysis, a markup analysis and a link analysis. Semantic analysis may yield data indicative/representative of a meaning/gist of (one or more portions of) the analyzed content. Semantic analysis may yield data indicative of semantic relationship, e.g., indicative of a degree of semantic similarity, between (one or more portions of) the analyzed content and other content, e.g., between the communicated (first) content and the retrieved (second) content and/or between the retrieved (second) content and one or more (stored) content items. Syntax analysis may yield data indicative/representative of a structure and/or grammar of (one or more portions of) the analyzed content. Keyword analysis may yield a list of keywords contained in (one or more portions of) the analyzed content. Markup analysis may yield data representative of markup contained in and/or a markup structure used in (one or more portions of) the analyzed content. Link analysis may yield a list of links contained in (one or more portions of) the analyzed content. Link analysis may likewise yield a list of links in the Internet pointing to webpages that contain (one or more portions of) the analyzed content. Link analysis may moreover yield, for any (one or more or each) webpage that contains (one or more portions of) the analyzed content, data representative of a page ranking of the respective webpage. The performing of an analysis may constitute part of the aforementioned establishing of (third) content.

The method may comprise determining a measure of similarity between a (stored) content item and retrieved content, e.g., between a (stored) content item and (one or more portions of) the analyzed (second) content, using a result of the analysis. For example, the method may comprise determining, for each of a plurality of content items, a measure of similarity between the respective content item and the retrieved (second) content using a result of the analysis. The method may comprise storing the measure of similarity, e.g., together with the respective content item.

As touched upon above, the method may comprise modifying content, e.g., the first content, to obtain other (third) content using a result of the analysis and/or a determined measure of similarity. Similarly, the method may comprise selecting content, e.g., from a plurality of (stored) content items, using a result of the analysis and/or a determined measure of similarity. The modifying/selecting of content may constitute part of the aforementioned establishing of (third) content. Such modified and/or selected content may constitute all or part of the (third) content to be established.

The method may comprise determining a security level of retrieved (second) content. Similarly, the method may comprise determining a security level of a location of the retrieved (second) content on a public network, e.g., of a (n Internet) webpage containing (one or more portions of) the retrieved (second) content. The determining may yield data indicative of a trust level of the retrieved content, e.g., indicative of a trust level of portlets from which a respective webpage containing the retrieved content obtained (one or more portions of) the retrieved content. Such a trust level may be assessed using a white list of trusted portlets and/or a blacklist of untrusted portlets. The determining may moreover indicate whether the retrieved content contained sensitive content. Similarly, the determining may yield an indication of security measures implemented by a respective webpage containing (one or more portions of) the retrieved (second) content to restrict/prevent access to sensitive content. The determining of a security level may constitute part of the aforementioned establishing of (third) content.

The method may comprise modifying content, e.g., the first content, to obtain other (third) content using a determined security level. Similarly, the method may comprise selecting content, e.g., from a plurality of (stored) content items, using a determined security level. The modifying/selecting of content may constitute part of the aforementioned establishing of (third) content. Such modified and/or selected content may constitute all or part of the (third) content to be established.

The method may comprise communicating established (third) content to a consumer, e.g., in response to a content request from the consumer. Communication of content to a consumer may be subject to fulfillment of a given security level. For example, the method may comprise communicating established (third) content to a consumer (only) if a determined security level exceeds a given security level. Similarly, the method may comprise communicating an error message to a consumer if a determined security level does not exceed a given security level.

The method may comprise establishing a (second) identifier not contained in given content, e.g., not contained in the retrieved (second) content. For example, the method may comprise generating/obtaining n-digit random numbers or n-character random (alphanumeric) strings until a random number/string is found that is not contained in the given content.

The method may comprise modifying given content, e.g., the aforementioned first content or established (third) content, to include the established (second) identifier. The given content may be modified such that the established (second) identifier is not (readily) visible to an end-user, e.g., when the given content is rendered in a browser.

The method may comprise communicating the modified (first/third) content including the established (second) identifier to a consumer, e.g., in response to a content request.

As described above, the method may comprise instructing a search engine to perform a search on a network. The search may comprise a search for the established (second) identifier. Accordingly, the method may comprise receiving, e.g., from a search engine, a search result indicative of a location of the modified (first/third) content including the established (second) identifier in the network.

While the teachings of the present disclosure have been discussed hereinabove mainly in the form of a method, the teachings may be embodied, mutatis mutandis, in the form of a system, e.g., a content generating system, or a computer program product, as will be appreciated by the person skilled in the art.

The system may be configured and adapted to effect any of the actions described above with respect to the disclosed method. For example, the system may comprise a processor that effects any of the actions described above with respect to the disclosed method.

The system may comprise a content communicator that communicates (first) content, e.g., as described hereinabove.

The system may comprise a content locator that determines a location of content, e.g., as described hereinabove.

The system may comprise a content retriever that retrieves (second) content, e.g., as described hereinabove.

The system may comprise a content establisher that establishes (third) content, e.g., as described hereinabove.

The system may comprise a security level checker that determines a security level of (second) content, e.g., as described hereinabove.

Any of the aforementioned components of the system may communicate with any other of the aforementioned components of the system. In this respect, the system may comprise one or more communication busses/links interconnecting the respective components.

Figure 1:
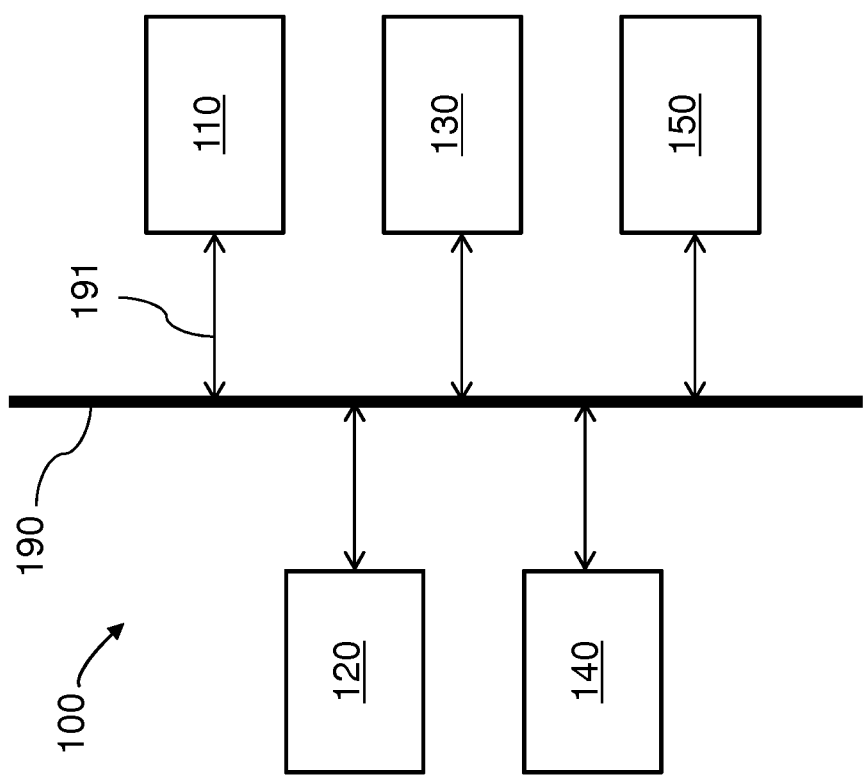
FIG. 1 schematically shows an embodiment of a content generating system in accordance with the present disclosure.

FIG. 1 schematically shows an embodiment of a content generating system 100 in accordance with the present disclosure, e.g., as described above.

In the illustrated embodiment, content generating system 100 comprises a content communicator 110, a content locator 120, a content retriever 130, a content establisher 140, an optional security level checker 150 and a communication bus 190 comprising a plurality of communication links 191 (for the sake of legibility, only one of the communication links bears a reference sign). Communication bus 190 and the communication links 191 communicatively interconnect the aforementioned components 110-150.

FIGS. 2A to 2G schematically show flow diagrams relating to respective embodiments of a method of generating content in accordance with the present disclosure, e.g., as described above.

FIG. 2A schematically shows a flow diagram 200A of an embodiment of a method of generating content in accordance with the present disclosure.

In the illustrated embodiment, flow diagram 200A comprises a step 210 of communicating (first) content, a step 220 of determining a location of (said first) content in a network, a step 230 of retrieving (second) content from the location and a step 240 of establishing (third) content using the retrieved (second) content.

Figure 2D:
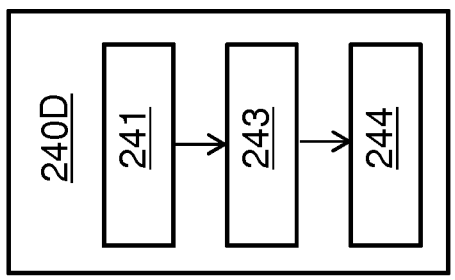
FIG. 2D schematically shows details from a flow diagram of another modified embodiment of the method of generating content shown in FIG. 2A.
Figure 2E:
FIG. 2E schematically shows details from a flow diagram of another modified embodiment of the method of generating content shown in FIG. 2A.
Figure 2B:
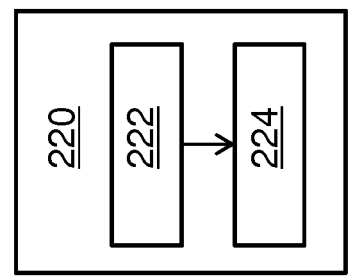
FIG. 2B schematically shows details from a flow diagram of a modified embodiment of the method of generating content shown in FIG. 2A.

FIG. 2B schematically shows details from a flow diagram 200B of a modified embodiment of the method of generating content shown in FIG. 2A. Specifically, FIG. 2B schematically depicts a flow diagram of an optional embodiment of step 220 shown in FIG. 2A.

In the illustrated embodiment, step 220 comprises a step 222 of instructing a search engine to perform a search and a step 224 of receiving a search result.

Figure 2C:
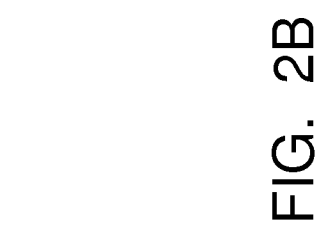
FIG. 2C schematically shows details from a flow diagram of another modified embodiment of the method of generating content shown in FIG. 2A.

FIG. 2C schematically shows details from a flow diagram of another modified embodiment of the method of generating content shown in FIG. 2A. Specifically, FIG. 2C schematically depicts a flow diagram of an optional embodiment 240C of step 240 shown in FIG. 2A.

In the illustrated embodiment, step 240C comprises a step 241 of performing an analysis of content and a step 242 of selecting at least one of a plurality of content items using a result of the analysis.

FIG. 2D schematically shows details from a flow diagram of another modified embodiment of the method of generating content shown in FIG. 2A. Specifically, FIG. 2D schematically depicts a flow diagram of an optional embodiment 240D of step 240 shown in FIG. 2A.

In the illustrated embodiment, step 240D comprises a step 241 of performing an analysis of content, a step 243 of determining a measure of similarity between content and a respective content item and a step 244 of selecting at least one of a plurality of content items using the measure of similarity.

FIG. 2E schematically shows details from a flow diagram of another modified embodiment of the method of generating content shown in FIG. 2A. Specifically, FIG. 2D schematically depicts a flow diagram of an optional embodiment 240E of step 240 shown in FIG. 2A.

In the illustrated embodiment, step 240E comprises a step 245 of determining a security level of content and a step 246 of establishing (third) content using the security level.

FIG. 2F schematically shows a flow diagram of another modified embodiment of the method of generating content shown in FIG. 2A.

In the illustrated embodiment, flow diagram 200F comprises a step 210 of communicating (first) content, a step 220 of determining a location of (said first) content in a network, a step 230 of retrieving (second) content from the location, a step 240 of establishing (third) content using the retrieved (second) content, a step 250 of determining a security level of content and a step 255 of communicating content or an error message depending on the security level.

FIG. 2G schematically shows a flow diagram of another modified embodiment of the method of generating content shown in FIG. 2A.

In the illustrated embodiment, flow diagram 200G comprises a step 210 of communicating (first) content, a step 220 of determining a location of (said first) content in a network, a step 230 of retrieving (second) content from the location, a step 240 of establishing (third) content using the retrieved (second) content, a step 260 of establishing a (second) identifier, a step 265 of modifying content to include the (second) identifier, a step 270 of communicating the modified content, a step 275 of instructing a search engine to perform a search for the (second) identifier and a step 280 of receiving a search result.

Figure 3:
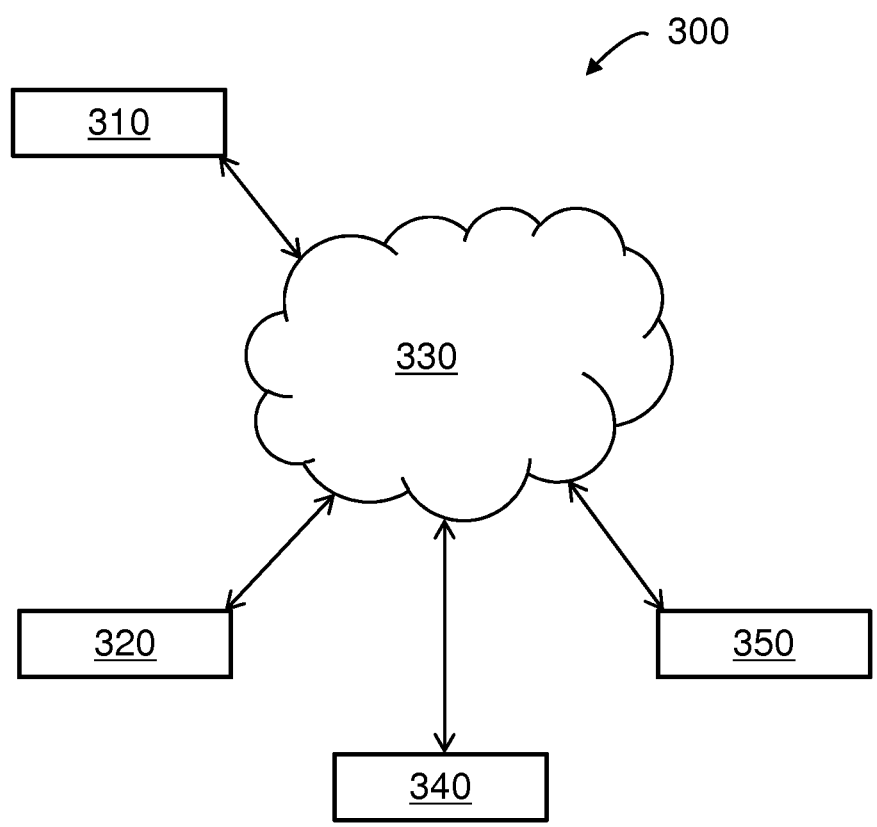
FIG. 3 schematically shows an embodiment of a network in accordance with the present disclosure.

FIG. 3 schematically shows an embodiment of a network 300 in accordance with the present disclosure, e.g., as described above.

In the illustrated embodiment, network 300 comprises a content producer 310, a consumer 320, a sub-network 330, an end-user 340 and a search engine 350. As indicated by arrows, each of content producer 310, consumer 320, end-user 340 and search engine 350 can communicate bi-directionally with one another via sub-network 330.

As described above, content producer 310 may communicate first content, e.g., a portlet, to consumer 320. Consumer 320 may then publish the first content on network 300 for consumption by end-user 340. Content producer 310 may determine, by means of a search engine query to search engine 350, a location of the communicated first content in network 300, namely the location of consumer 320. Content producer 310 may then retrieve second content, e.g., a webpage containing the portlet, from that location, mainly from consumer 320. Using that retrieved second content, content producer 310 may then establish third content, e.g., content that is adapted to the manner in which consumer 320 publishes such content on network 300.

The inventive arrangements broadly described hereinabove is described more concretely hereinbelow including disclosure of further embodiments.

The content may be representative of (part of) a portal or portlet. The portal may provide access to user specific information, applications and processes using local and remote information sources. The portal may combine aggregated applications and provide a unified presentation layer. The portal implementation may provide a component model that allows plugging components referred to as portlets into the portal infrastructure. Portlets, as defined by the Portlet specifications (see JSR168 and JSR286), are user-facing interactive web applications that render markup fragments. The content of a portlet may be aggregated with content from other portlets to form a portal page.

Besides portlets locally executed on the portal system, another standard named WSRP (OASIS Web Services for Remote Portlets) provides mechanisms that allow dynamic integration of portlets executed on remote portal systems—so called WSRP producers—into other—so called WSRP consumer—portals. Remote portlets provide markup fragments that combine data and presentation logic and that can be aggregated together with local portlets to form the content of a portal page.

In a distributed environment using the remote portlet technology, WSRP producers can provide portlets as a service to WSRP consumers. In such an environment the WSRP producer can be viewed as a software service host, running the application logic, the data layer and providing the presentation layer to the WSRP consumers. Producers can serve a multitude of consumers providing the same service to those consumers.

In this environment WSRP consumer portals are the entry point for the end users and interact independently of other consumers, i.e., they provide an isolated environment and user space. From a user's perspective each consumer portal is a separate, independent web site providing certain service for its end-users.

A consumer portal may include remote portlets on one or multiple portal pages. The portal pages are managed by the consumer portal and may contain other portlets as well as further content from different sources.

Inter alia, the present disclosure teaches techniques for a WSRP producer to analyze consumer portal page context of remote portlets and to adapt remote portlets based on a result of this analysis.

The adaption may include creating specific markup/content for specific consumers that matches/conforms to the consumer side portal context of the portlet. For example, the producer may adapt portlet markup such that it better integrates into the consumer portal page or matches other content on the consumer portal page, e.g., by adding or removing content fragments (or advertisements) that are relevant in this specific context or by applying a different formatting of the content.

The producer may search for and analyze consumer pages that contain the remote portlet and adapt portlet delivery and/or portlet content based on the analysis. The search/analysis may involve any (one or more or each) of the actions described in the following paragraphs.

The producer may prepare a web search query (e.g., a Google, Bing and/or Yahoo query). The search terms may be taken from the portlet markup. For example, the producer may determine the search terms that are to be included in the search query and retrieve portlet markup by invoking the remote portlet and receiving the returned portlet markup. From the portlet markup the producer may select a set of search terms. For example, the producer may determine/create, e.g., using a markup adaptation system, an identifier that is both unique for the portlet and for the consumer and select this identifier as a search term. In such an embodiment, the producer may intercept any markup that is returned by the portlet as a result of a remote portlet request and insert the (unique) identifier in a markup element that is accessible to web search engines. The producer may include the (unique) identifier in a markup element that is invisible to a human user. This interception and markup adaptation may be performed by the portlet markup adaptation system and may be performed for each portlet response that returns portlet markup.

The producer may issue, e.g., using a search system, the search query containing the search terms to the search engine. For example, the producer's search system may form a HTTP request to conforms to the search engine's request format and includes the search terms (e.g., the (unique) identifier), then send the request to the search engine. For example, the search system may send a HTTP request to Google having the following URL including the portlet title extracted from intercepted portlet markup and the unique id (similar to the id added to portlet markup) as search terms:

http://www.google.com/search?q=<portlet title>+<unique id>&ie=utf-8&oe=utf-8

Example:

http://www.google.com/search?q=test+portlet+id.4492047509&ie=utf-8&oe=utf-8

The search engine may return a HTTP response that contains a list of pages including the URLs of the pages. These URLs point to the consumer pages that contain the remote portlet.

The producer, e.g., the producer's search system, may receive and interpret the search results. For each page that is contained in said list of pages, the producer may request and receive the portal page from the consumer portal (using the URL extracted from the search results).

In order to ensure that the returned results are correct (i.e., that the pages really contain the remote portlet), the producer may verify the pages. The producer may search, e.g., using a verification system, for the search terms in the page content and thus verify that the portlet is really contained on the page. If the respective page does not contain the search terms, the producer may ignore the respective page.

The producer, e.g., the search system, may pass the consumer page on for analysis, e.g., to an analysis system, or store the page related information (URL and page content) in an analysis database for later analysis.

The producer, e.g., the analysis system, may analyze the consumer pages and, optionally, store the results of this analysis in the analysis database.

This analysis may include parameters that are derived from the consumer portal pages (or in other words the consumer portal page context) of the remote portlet. The producer, e.g., the analysis system, may determine a set (or subset) of the following parameters:

semantic relationship between the portlet content and the consumer portal page semantic relationship between consumer portal page and one or multiple content items parameters representing the occurrence of a set of keywords parameters representing the link structure of the page, regarding the outgoing links of the page the links pointing to the page (e.g., page rank of the page, as available e.g., from Google®)

parameters representing the markup structure of the page (e.g., parameters signaling the use of certain constructs of markup languages or scripting languages)

parameters representing the user experience of the page parameters representing the security context of the page The aforementioned adaption of portlet delivery and/or portlet content based on the analysis may involve any (one or more or each) of the actions described in the following paragraphs.

For example while processing remote portlet requests, the producer may receive a portlet response from the portlet and may (automatically) adapt, e.g., using the aforementioned markup adaptation system, the portlet response (e.g., the portlet markup) based on the analysis.

The producer/markup adaptation system may become involved/may be invoked (again) when the portlet response is available. The producer/a modification subsystem of the markup adaptation system may read and modify the portlet response based on the analysis results, e.g., may retrieve previously calculated analysis results from the analysis database or may directly invoke the analysis system, which may perform the analysis at the time of invocation.

The producer/markup adaptation system may invoke the analysis system to analyze the consumer page for semantic similarity with a set of content items from a content repository. Depending on the degree of semantic similarity, the producer/portlet markup adaptation system may choose one or multiple content items and include it into the portlet markup. The content items may be taken from database, e.g., from a content management system, and may represent advertisements. The content items may be obtained from a third party advertisement provider. The portlet may include placeholder elements in the portlet markup that are replaced by selected content items, e.g., by the portlet markup adaptation system. For example, the portlet markup adaptation system may determine all placeholders in the portlet markup and iterate over all placeholders, replacing each placeholder by one content item markup fragment. Similarly, when the portlet response is available, the portlet markup adaptation system may retrieve the analysis results from the analysis results database, select appropriate content items and add these content items to the portlet markup, even if the portlet markup does not contain placeholders.

In the follow, techniques for the aforementioned analysis and optional implementations of the aforementioned analysis system will be described in further detail, in particular as regards the calculation of parameters representing a semantic relationship between a consumer portal page and a set of content items.

The analysis component may be invoked to calculate semantic similarity metrics. The metric may represent the semantic similarity between the consumer portal page and a respective content item.

The analysis component may retrieve the set of content items from a database, e.g., from a content repository, and retrieve the consumer page markup from the analysis database or accept it as an input parameter from a calling component.

The analysis component may use the following input parameters:

the consumer portal page markup from the consumer portal page (e.g., HTML, XHTML, XML), not including the remote portlet markup.

the set of content items consisting of a markup fragment (e.g., HTML, XHTML, XML).

The analysis component may calculate the semantic similarity metric based on these input parameters. The calculation may be based on conventional text processing and text mining techniques that are applied to the input data and which return a set of metrics representing the semantic similarity $sim(P, Ci)$ between the portal page P and one content item Ci. For example, distance calculation such as TF-IDF Weighting and Cosine Similarity Measure may be used to calculate the distance $d(P, Ci)$ between two elements, the first element being the portal page and the second element being a respective content item. The semantic similarity metric may be calculated as the inverse of the distance, e.g., $sim(P,Ci)=1/d(P,Ci)$.

Such a metric may be calculated for each content item. The analysis component may provide the set of metrics to the portlet markup adaptation system that selects a subset of the set of content items where the selected content items have a higher similarity $sim(P,Ci)$ than the non-selected content items. The portlet markup adaptation system may add the selected content items markup fragments to the portlet markup.

The producer/analysis system may analyze the security context of the consumer page.

For example, the producer/analysis system may determine parameters representative of whether other portlets and/or content items on the consumer page are trusted or untrusted. The producer/analysis system may determine other portlets or content items on the page by inspecting the page markup (e.g., looking for characteristic HTML elements that define portlet or content item titles, boundaries between portlets, etc.) and consulting a white list or a black list of portlets and content items indicative of "trusted" or "untrusted" status. Similarly, a web site or a repository (or an element of the producer's system) may aggregate feedback or ratings of the portlets or content items, and the producer may use information from these sources.

The producer/analysis system may determine parameters representative of whether the consumer exposes sensitive markup fragments of the remote portlet to the public, e.g., without requiring user login. This analysis may be effected by comparing consumer portal page markup and samples of sensitive portlet markup fragments.

From these parameters, the producer/analysis system may determine a security level for the consumer page, e.g., "trusted" or "untrusted" or a numerical value.

The producer/markup adaptation system may include/excludes markup fragments (e.g., sensitive information) from the portlet markup depending on the security level. If the security level lies below a threshold value, the producer/markup adaptation system may refuse sending the response and instead return an error message.

The producer may process portlet events and shared render parameters (or other objects that are defined in the portlet API or the WSRP specification and are contained in remote portlet requests or responses) depending on the results of the analysis. The producer may ignore any events and shared render parameters if the security level of the consumer page is below a defined threshold or if there are any blacklisted portlets on the consumer page.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof In the present disclosure, the verb "may" is used to designate optionality/noncompulsoriness. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of generating content, the method comprising:
communicating first content to a consumer, the first content comprising at least one identifier;
determining a location of the communicated first content in a network;
retrieving second content from the location; and
establishing third content using the second content using a processor;
wherein the determining the location of the communicated first content comprises instructing a search engine to perform a search in a network for the at least one identifier and receiving, from the search engine, a search result indicative of a location of the communicated first content in the network, and wherein the establishing third content comprises performing an analysis of the second content, the analysis comprising at least one of a semantic analysis, a syntax analysis, a keyword analysis, a markup analysis, or a link analysis.

2. The method of claim 1, wherein the establishing third content comprises selecting at least one of a plurality of content items as part of the third content using a result of the analysis.

3. The method of claim 1, wherein the establishing third content comprises:
determining, for each of a plurality of content items, a measure of similarity between the respective content item and the second content using a result of the analysis; and
selecting at least one of the content items as part of the third content using the measure of similarity.

4. The method of claim 1, wherein the establishing third content comprises:
determining a security level of the second content; and
establishing the third content using the security level.

5. The method of claim 1, further comprising:
determining a security level of the second content; and
communicating the third content to the consumer if the security level exceeds a given security level and communicating an error message to the consumer if the security level does not exceed the given security level.

6. The method of claim 1, further comprising:
establishing a second identifier not contained in the second content;
modifying the third content to include the second identifier;
communicating the modified third content to the consumer;
instructing the search engine to perform a search in the network for the second identifier; and
receiving, from the search engine, a search result indicative of a location of the communicated third content in the network.

7. The method of claim 1, wherein each of the first content, the second content and the third content comprises HTML 2.0 standard conformant data.

8. A content generating system, comprising:
a processor programmed to initiate executable operations comprising:
communicating first content to a consumer, the first content comprising at least one identifier;
determining a location of the communicated first content in a network;
retrieving second content from the location; and
establishing third content using the second content;
wherein the determining the location of the communicated first content comprises instructing a search engine to perform a search in a network for the at least one identifier and receiving, from the search engine, a search result indicative of a location of the communicated first content in the network, and wherein the establishing third content comprises performing an analysis of the second content, the analysis comprising at least one of a semantic analysis, a syntax analysis, a keyword analysis, a markup analysis, or a link analysis.

9. The system of claim 8, wherein the establishing third content comprises selecting at least one of a plurality of content items as part of the third content using a result of the analysis.

10. The system of claim 8, wherein the establishing third content comprises:
determining, for each of a plurality of content items, a measure of similarity between the respective content item and the second content using a result of the analysis; and
selecting at least one of the content items as part of the third content using the measure of similarity.

11. The system of claim 8, wherein the establishing third content comprises:
determining a security level of the second content; and
establishing the third content using the security level.

12. The system of claim 8, further comprising:
determining a security level of the second content; and
communicating the third content to the consumer if the security level exceeds a given security level and communicating an error message to the consumer if the security level does not exceed the given security level.

13. The system of claim 8, further comprising:
establishing a second identifier not contained in the second content;
modifying the third content to include the second identifier;
communicating the modified third content to the consumer;
instructing the search engine to perform a search in the network for the second identifier; and
receiving, from the search engine, a search result indicative of a location of the communicated third content in the network.

14. The system of claim 8, wherein each of the first content, the second content and the third content comprises HTML 2.0 standard conformant data.

15. A computer program product comprising;
a computer readable hardware storage device having program code stored thereon,
the program code executable by a processor to perform:
communicating first content to a consumer using the processor, the first content comprising at least one identifier;

determining a location of the communicated first content in a network using the processor;

retrieving second content from the location using the processor; and establishing third content using the second content using the processor;

wherein the determining the location of the communicated first content comprises instructing a search engine to perform a search in a network for the at least one identifier and receiving, from the search engine, a search result indicative of a location of the communicated first content in the network, and wherein the establishing third content comprises performing an analysis of the second content, the analysis comprising at least one of a semantic analysis, a syntax analysis, a keyword analysis, a markup analysis, or a link analysis.

16. The computer program product of claim 15, wherein the establishing third content comprises selecting at least one of a plurality of content items as part of the third content using a result of the analysis.

17. The computer program product of claim 15, wherein the establishing third content comprises:

determining, for each of a plurality of content items, a measure of similarity between the respective content item and the second content using a result of the analysis; and selecting at least one of the content items as part of the third content using the measure of similarity.

18. The computer program product of claim 15, wherein the establishing third content comprises:

determining a security level of the second content; and establishing the third content using the security level.

19. The computer program product of claim 15, further comprising:

determining a security level of the second content; and communicating the third content to the consumer if the security level exceeds a given security level and communicating an error message to the consumer if the security level does not exceed the given security level.

20. The computer program product of claim 15, further comprising:

establishing a second identifier not contained in the second content;

modifying the third content to include the second identifier;

communicating the modified third content to the consumer;

instructing the search engine to perform a search in the network for the second identifier; and receiving, from the search engine, a search result indicative of a location of the communicated third content in the network.

* * * * *